United States Patent
Kim

(10) Patent No.: US 8,795,867 B2
(45) Date of Patent: Aug. 5, 2014

(54) WIRE MOUNTED BATTERY MODULE ON VERTICAL SUPPORT FRAME

(75) Inventor: Tae-Yong Kim, Suwon-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 431 days.

(21) Appl. No.: 12/801,766

(22) Filed: Jun. 24, 2010

(65) Prior Publication Data

US 2011/0151298 A1    Jun. 23, 2011

(30) Foreign Application Priority Data

Dec. 21, 2009  (KR) .................. 10-2009-0128176

(51) Int. Cl.
    *H01M 2/10*         (2006.01)
(52) U.S. Cl.
    CPC .............. *H01M 2/10* (2013.01); *H01M 2/1016* (2013.01); *H01M 2/1061* (2013.01); *H01M 2/1072* (2013.01); *H01M 2/1077* (2013.01); *H01M 2/1083* (2013.01); *H01M 2/1088* (2013.01)
    USPC .................. 429/100; 429/99; 429/71; 429/72; 429/120; 429/153; 248/300; 248/309.1; 248/317; 248/500; 248/505; 248/506

(58) Field of Classification Search
    CPC ... H01M 2/10; H01M 2/1016; H01M 2/1061; H01M 2/1072; H01M 2/1077; H01M 2/1083; H01M 2/1088
    USPC ............... 429/99–100, 71–72, 120, 153–159; 248/300, 309.1, 317, 500, 505, 506
    See application file for complete search history.

(56) References Cited

U.S. PATENT DOCUMENTS

| | | | |
|---|---|---|---|
| 5,789,898 A * | 8/1998 | Suzuki et al. | 320/104 |
| 2004/0021442 A1* | 2/2004 | Higashino | 320/112 |
| 2004/0058233 A1 | 3/2004 | Hamada et al. | |
| 2007/0190409 A1* | 8/2007 | Sakurai | 429/159 |
| 2008/0248377 A1 | 10/2008 | Hashida | |
| 2008/0280173 A1 | 11/2008 | Origuchi et al. | |
| 2008/0280198 A1* | 11/2008 | Kumar et al. | 429/138 |
| 2010/0119926 A1 | 5/2010 | Gaben et al. | |
| 2010/0255363 A1 | 10/2010 | Yoon et al. | |

FOREIGN PATENT DOCUMENTS

| | | | | |
|---|---|---|---|---|
| CN | 101589490 A | 11/2009 | | |
| EP | 1701404 A1 | 9/2006 | | |
| GB | 2015951 A | * | 3/1979 | ............. B60R 18/02 |
| JP | 06-74719 U | 10/1994 | | |

(Continued)

OTHER PUBLICATIONS

European Office Action in EP 10175935.5-1227, dated Nov. 24, 2011 (Kim).

Extended European Search Report in EP 10175935.5-1227, dated Nov. 22, 2010 (Kim).

European Office Action in EP 10175935.5-1227, dated Jul. 14, 2011 (Kim).

(Continued)

*Primary Examiner* — Milton I Cano
*Assistant Examiner* — Michael Dignan
(74) *Attorney, Agent, or Firm* — Lee & Morse, P.C.

(57) ABSTRACT

A battery pack and a vehicle including the same, the battery pack including a battery module including at least one battery cell; a support frame for supporting the battery module; and a support portion including a wire for supporting the battery module with respect to the support frame.

18 Claims, 7 Drawing Sheets

(56) References Cited

FOREIGN PATENT DOCUMENTS

| | | | | |
|---|---|---|---|---|
| KR | 10 2006-0087512 A | 8/2006 | | |
| KR | 10 2007-0081584 A | 8/2007 | | |
| KR | 10-2008-0071165 A | 8/2008 | | |
| KR | 10-1141057 A | 4/2012 | | |
| WO | WO 2006/046515 A1 | 5/2006 | | |
| WO | WO 2008059123 | * | 5/2008 | ............ H01M 10/50 |
| WO | WO 2008/137232 A1 | 11/2008 | | |

OTHER PUBLICATIONS

Japanese Office Action in JP 2010-163248, dated Aug. 21, 2012 (Kim).

Korean Notice of Allowance in KR 10-2009-0128176, dated Aug. 14, 2012 (Kim).

European Office Action in EP 10175935.5-1227, dated Aug. 27, 2012 (Kim).

Chinese Office Action Dated Mar. 5, 2014.

* cited by examiner

WIRE MOUNTED BATTERY MODULE ON VERTICAL SUPPORT FRAME

Korean Patent Application No. 10-2009-0128176, filed on Dec. 21, 2009, in the Korean Intellectual Property Office, and entitled: "Battery Pack and Vehicle Including Battery Pack," is incorporated by reference herein in its entirety.

BACKGROUND

1. Field

Embodiments relate to a battery pack and a vehicle including the battery pack.

2. Description of the Related Art

In general, unlike primary batteries, which are not chargeable, secondary batteries are chargeable and dischargeable. Secondary batteries are widely used in high-technology electronic devices, e.g., cellular phones, laptops, and camcorders, and are also used in vehicles.

Secondary batteries include an electrode assembly and an electrolyte. The electrode assembly includes a positive plate, a negative plate, and a separator. In a lithium ion secondary battery, the electrolyte includes lithium ions. The positive plate and the negative plate of the electrode assembly may each include an electrode tap protruding outside the electrode assembly.

The electrode assembly is accommodated inside a case, and an electrode terminal may be exposed outside the case. The electrode tap that protrudes outside of the electrode assembly may be electrically connected to the electrode terminal. The case may have, e.g., a cylindrical shape or an angular shape.

A plurality of unit secondary battery cells may be horizontally and/or vertically stacked so as to form a battery module. In addition, a plurality of battery modules may be vertically and/or horizontally stacked so as to form one battery pack.

SUMMARY

Embodiments are directed to a battery pack and a vehicle including the battery pack, which represents advances over the related art.

It is a feature of an embodiment to provide a battery pack formed by stacking a plurality of battery cells, wherein cooling efficiency of the battery pack is improved while a space for installing the battery cells is reduced.

At least one of the above and other features and advantages may be realized by providing a battery pack including a battery module including at least one battery cell; a support frame for supporting the battery module; and a support portion including a wire for supporting the battery module with respect to the support frame.

The battery module may be supported with respect to the support frame in such a way that the at least one battery cell contacts the support frame so as to be supported with respect to the support frame.

A plurality of the battery modules may be disposed on two surfaces of the support frame so as to be supported with respect to the support frame.

The support portion may include a first bracket on a first surface of the battery module opposite to a second surface of the battery module that contacts the support frame, the first bracket supporting the battery module with respect to one surface of the support frame; a second bracket on a first surface of the battery module opposite to a second surface of the battery module that contacts the support frame, the second bracket supporting the battery module with respect to another surface of the support frame; and a wire passing through the support frame and the first bracket and connected to the second bracket.

The wire may pass between battery cells of the battery module.

The first bracket or the second bracket may include an extension portion extending in a direction parallel to a direction in which battery cells are stacked so as to contact first surfaces of the battery cells opposite to second surfaces of the battery cells that contact the support frame; and a bent portion bent from the extension portion, the bent portion contacting a side surface of at least one of an uppermost battery cell of the battery module and a lowermost battery cell of the battery module.

The support portion may include a wire supporting member on the first bracket, the wire supporting member supporting the wire; and a tension adjuster on the second bracket, the tension adjuster supporting the wire and being configured to adjust tension of the wire.

The wire supporting member may be disposed on a first surface of the first bracket opposite to a second surface of the first bracket that contacts the battery module, and may support the wire.

The first bracket may include a support groove having an angular shape in the first surface thereof, wherein at least a portion of the wire support member extends into the support groove, and a through hole through the support groove, the wire passing through the through hole.

The tension adjuster may include a support bolt, the support bolt including a fixation portion at one side of the support bolt, the fixation portion supporting the wire and passing through the second bracket, and a screw portion at another side of the support bolt, the screw portion being exposed outside of a first surface of the second bracket opposite to a second surface of the second bracket that contacts the battery module and including a screw thread on an outer circumferential surface thereof; and a support nut coupled to the screw portion of the support bolt, the support nut contacting the first surface of the second bracket.

The fixation portion may have an angular shape, and the second bracket may include a support hole that is a though hole, the support hole having an angular shape, the fixation portion may extend into the support hole.

The battery pack may further include a circulation flow channel in the support frame, the circulation flow channel being configured to circulate cooling fluid.

The battery pack may further include a fluid tank connected to one end of the circulation flow channel, the fluid tank being configured to accommodate the cooling fluid; and a pump connected to another end of the circulation flow channel, the pump being configured to supply the cooling fluid of the fluid tank to the circulation flow channel.

The battery pack may further include a base for accommodating the fluid tank and the pump, the base supporting a lower portion of the support frame.

The battery module may be disposed on a single surface of the support frame.

The supporting portion may include a second bracket on a first surface of the battery module opposite to a second surface of the battery module that contacts the support frame, the second bracket supporting the battery module with respect to a first surface of the support frame; a wire passing through the support frame and connected to the second bracket; a wire supporting member on the support frame, the wire supporting member supporting the wire; and a tension adjuster on the second bracket, the tension adjuster supporting the wire and being configured to adjust tension of the wire.

The wire supporting member may be disposed on a second surface of the support frame, the second surface being opposite to the first surface of the support frame, and may support the wire.

The support frame may include a support groove having an angular shape in the second surface thereof, at least a portion of the wire support member may extend into the support groove, and the support groove may include a through hole extending through the support frame.

At least one of the above and other features and advantages may also be realized by providing a vehicle including a vehicle body; and the battery pack of an embodiment, the battery pack being installed in the vehicle body.

The battery pack may be quick drop installed in the vehicle body.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
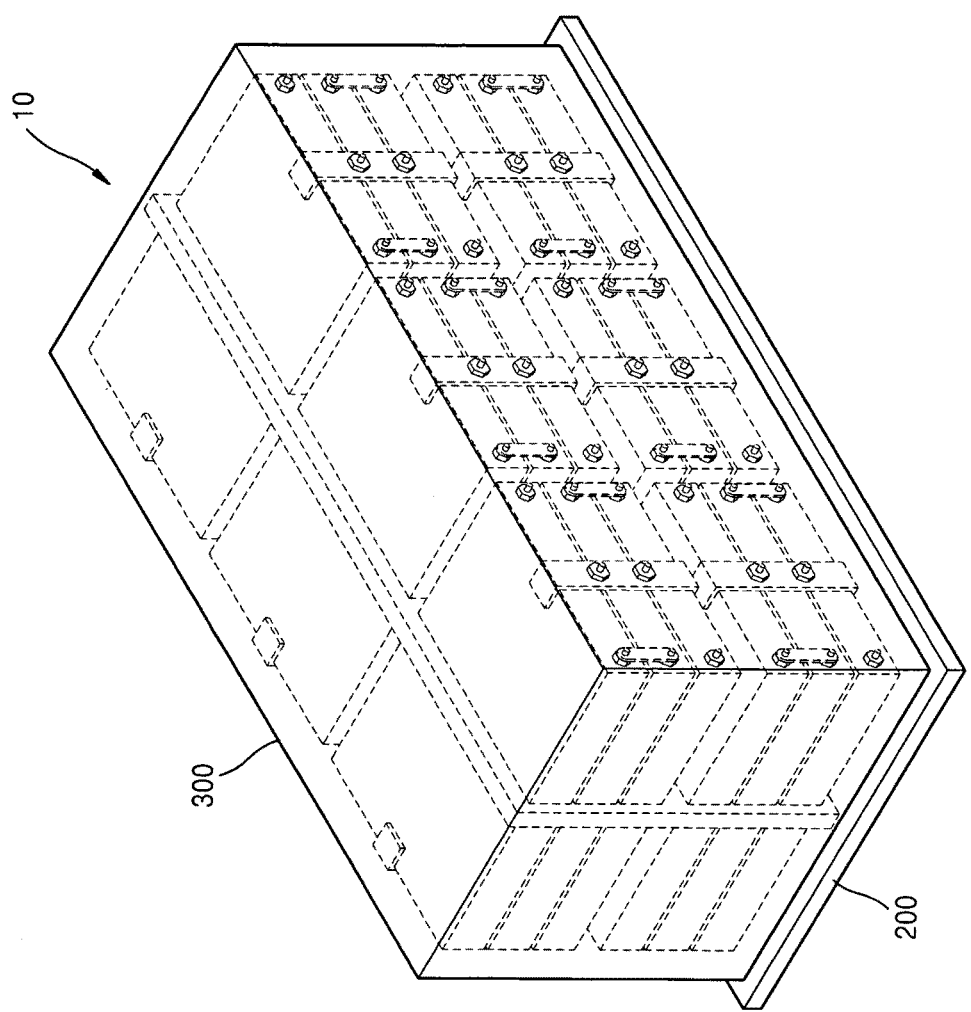
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
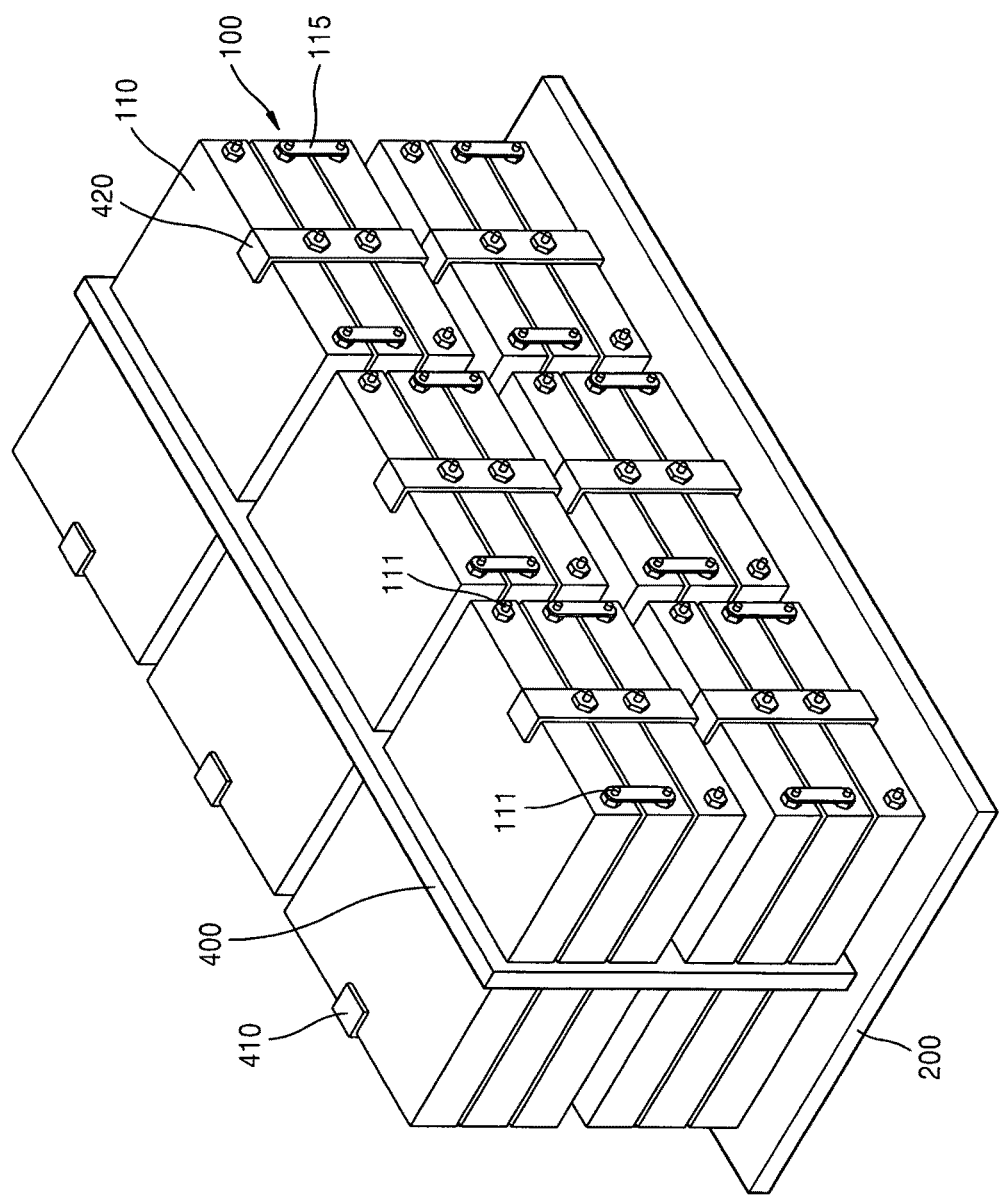
FIG. 2 illustrates a perspective view of the battery pack of FIG. 1 where a cover is removed.
Figure 3:
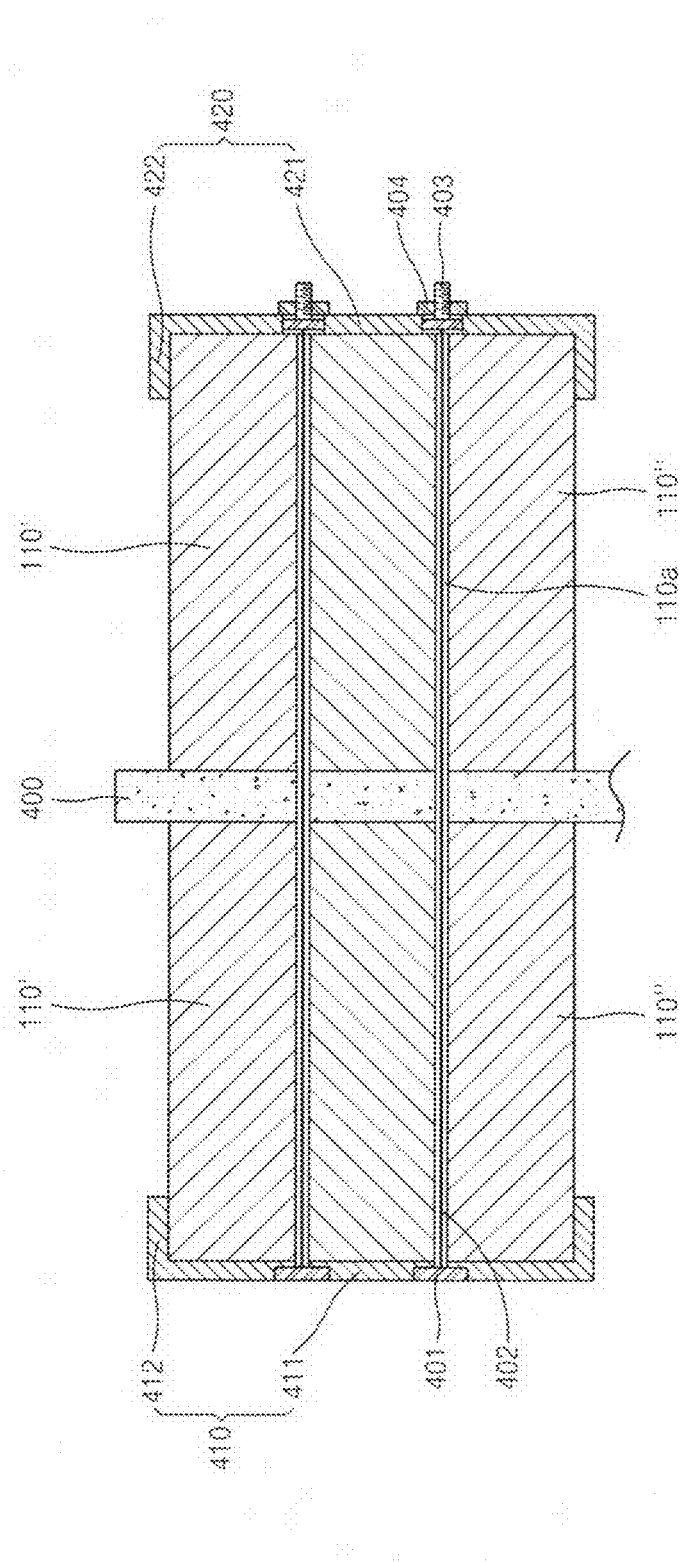
FIG. 3 illustrates a cross-sectional view of battery modules supported by wires with respect to two surfaces of a support frame, according to an embodiment.

FIG. 1 illustrates a perspective view of a battery pack 10 according to an embodiment. FIG. 2 illustrates a perspective view of the battery pack 10 of FIG. 1 where a cover 300 is removed. FIG. 3 illustrates a cross-sectional view of battery modules 100 supported by wires 402 with respect to two surfaces of a support frame 400, according to an embodiment.

The battery pack 10 may be formed by horizontally and/or vertically stacking the battery modules 100. The battery module 100 may include at least one battery cell 110 that are stacked on top of each other. Heat may be generated from the battery cells 110 during charging and discharging. Thus, performance and the lifetime of the battery cells 110 may be reduced.

In particular, as the number of battery cells 110 is increased, an amount of heat generated therefrom may increase. Thus, in the battery pack 10 according to the present embodiment, the battery module 100 including the battery cells 110 may be supported with respect to the support frame 400; and the heat generated from the battery cells 110 may be dissipated by, e.g., circulating cooling fluids in the support frame 400.

The battery pack 10 may be installed in, e.g., an electrical vehicle 1 (see FIG. 8) or a hybrid vehicle performing an electrical operation. In this case, the battery pack 10 may be installed in a limited space.

As many battery modules 100 as possible may be installed in a limited space of the battery pack 10. If a large number of battery modules 100 are installed in the battery pack 10, the battery pack 10 may have a high power output and longer lifetime.

In the battery pack 10 according the present embodiment, the battery cells 110 of the battery module 100 may be supported by the wires 402 with respect to the support frame 400. Thus, a space for supporting the battery cells 110 on the support frame 400 may be reduced in the battery pack 10. Accordingly, a size of the battery pack 10 may be reduced; and a large number of the battery cells 110 may be installed in a limited space.

The heat generated from the battery cells 110 may be effectively dissipated by more closely coupling the battery cells 110 to the support frame 400 in which cooling fluids are circulated. Thus, in the battery pack 10 according to the present embodiment, the battery cells 110 may be closely coupled to the support frame 400. To achieve this, the battery cells 110 may be uniformly attached to the support frame 400 by using a supporting method using the wires 402 in the battery pack 10.

Referring to FIGS. 1 through 3, the battery pack 10 may include the battery module 100, the support frame 400, and a support portion.

The battery module 100 may include at least one battery cell 110. The support frame 400 may support the battery module 100. The support portion may support the battery module 100 on the support frame 400 by using the wires 402.

The battery cells 110 may be stacked in a first direction, e.g., a vertical direction so as to form the battery module 100. The battery module 100 may be supported with respect to the support frame 400 in such a way that the battery cells 110 included in the battery module 100 may contact one surface or two surfaces of the support frame 400 and may be supported with respect to the surface or the two surfaces.

Figure 7:
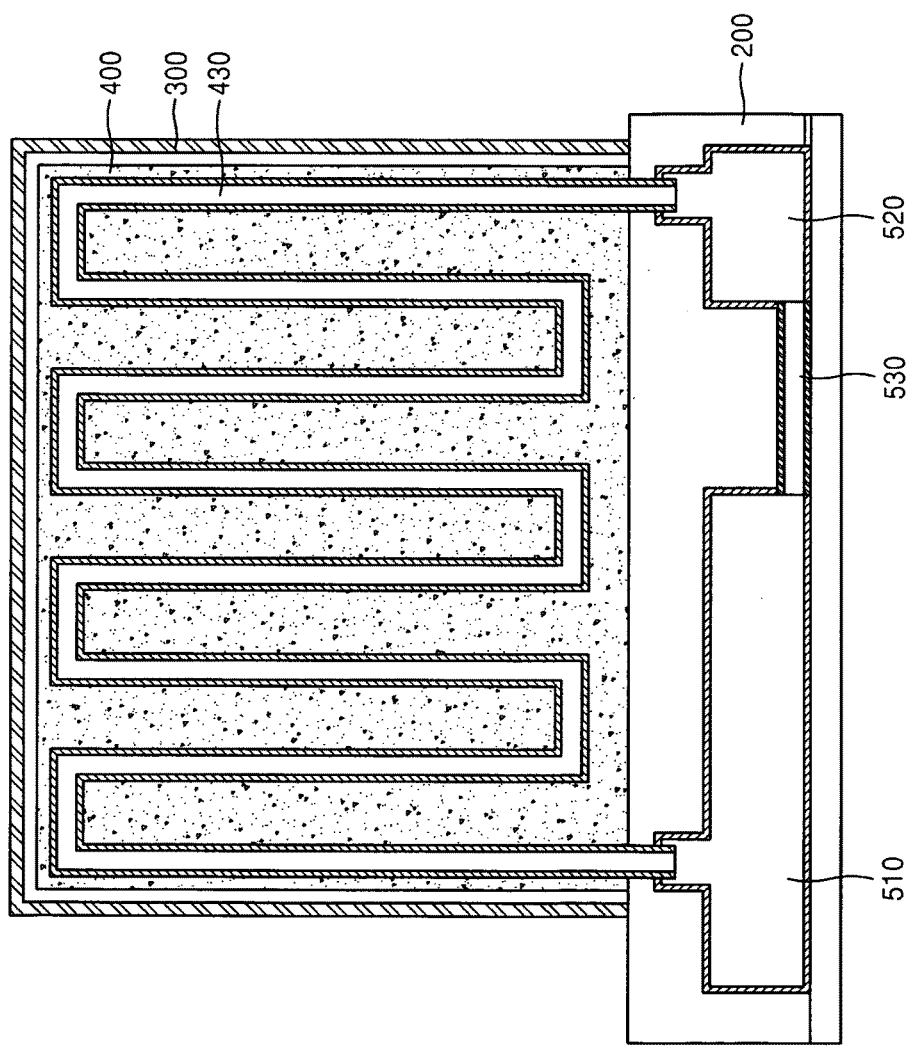
FIG. 7 illustrates a schematic cross-sectional view of a circulation flow channel, through which cooling fluids are circulated, arranged in a support frame, according to an embodiment.

In this case, the battery cells 110 that are closely coupled to the support frame 400 may be cooled by cooling the support frame 400. To achieve this, a circulation flow channel 430 may be disposed in the support frame 400, as illustrated in FIG. 7. The heat generated from the battery cells 110 may be dissipated away from the battery pack 10 by circulating cooling fluids through the circulation flow channel 430. Heat transferred from the battery cells 110 through the support frame 400 may be absorbed by the cooling fluids and may be dissipated away from the battery pack 10.

Heat generated from the battery cells 110 may be effectively transferred to the support frame 400 by more closely coupling the battery cells 110 to the support frame 400. Thus, in the battery pack 10 according to the present embodiment, the battery cells 110 may be uniformly attached to the support frame 400.

The battery cells 110 may be supported with respect to the support frame 400 so as to contact the support frame 400 with a uniform pressure. To achieve this, as illustrated in FIG. 3, the battery module 100 may be supported with respect to the support frame 400 by disposing the wires 402 through spaces 110a between the battery cells 110. An air channel for heat dissipation may be defined by the spaces 110a between the battery cells 110.

The spaces 110a between the battery cells 110 may have a shape corresponding to upper and lower cases of the battery cells 110 (e.g., an uneven shape), which face each other. In an implementation, the spaces 110a between neighboring battery cells 110 may be formed by inserting a separate member having an uneven shape between the neighboring battery cells 110.

The battery cells 110 may be stacked in a first direction, e.g., a vertical direction so as to form the battery module 100. As illustrated in FIGS. 1 through 3, the battery cells 110 may each have an angular shape; but the embodiments are not limited thereto. In an implementation, the battery cells 110 may have various shapes, e.g., circular battery cells or pouch type battery cells.

The battery cells 110 may be, e.g., lithium-ion batteries; but the embodiments are not limited thereto. In an implementation, various batteries including, e.g., nickel-cadmium secondary batteries, nickel-hydrogen secondary batteries, and lithium batteries, may be used as the battery cells 110.

As illustrated in FIG. 3, the battery module 100 may be disposed on and supported with respect to two surfaces of the support frame 400. Thus, the battery cells 110 may be effectively accommodated in the limited space of the battery pack 10. Therefore, as many battery cells 110 as possible may be accommodated in the limited space of the battery cells 110.

In order to support the battery module 100 with respect to the support frame 400, the support portion may include a first bracket 410, a second bracket 420, and the wires 402.

The first bracket 410 may be disposed on a first surface of the battery module 100 opposite to a second surface of the battery module 100 that contacts the support frame 400, so as to support the battery module 100 with respect to a first surface of the support frame 400. The second bracket 420 may be disposed on a first surface of another battery module 100 opposite to a second surface of the other battery module 100 that contacts the support frame 400, so as to support the battery module 100 with respect to a second surface of the support frame 400.

In other words, a plurality of battery modules 100 may be disposed on two opposing, i.e., first and second, surfaces of the support frame 400. The first bracket 410 may support the battery modules 100 with respect to one, i.e., the first, surface of the support frame 400, e.g., a left surface of the support frame 400 of FIG. 3. The second bracket 420 may support the battery modules 100 with respect to another, i.e., the second, surface of the support frame 400, e.g., a right surface of the support frame 400 of FIG. 3.

The battery cells 110 may include electrode terminals 111 that are exposed outside the battery cells 110. The electrode terminals 111 of neighboring battery cells 110 may be electrically connected to each other by bus bars 115.

The electrode terminals 111 may include positive and negative terminals. The neighboring battery cells 110 may be arranged so that the positive and negative terminals may be alternately arranged with respect to each other. The battery cells 110 may be connected in parallel, in series, or in both parallel and series.

Thus, the battery cells 110 may be sequentially connected to each other so as to form one battery module 100. The connection method and the number of battery cells 110 may be determined in consideration of desired recharge or discharge capacities when the battery cells are designed.

The electrode terminals 111 may be disposed on first surfaces of the battery cells 110 opposite to second surfaces thereof that contact the support frame 400. The first bracket 410 and the second bracket 420 may be disposed between the electrode terminals of the battery cells 110.

The first bracket 410 and the second bracket 420 may contact all battery cells 110 of one of the battery modules 100. In this case, the first bracket 410 and the second bracket 420 may more stably support all of the battery cells 110 of the battery module 100.

The wires 402 may pass through the support frame 400 so as to be connected from the first bracket 410 to the second bracket 420. To achieve this, through holes (not illustrated) through which the wires 402 pass may be formed in the support frame 400. The wires 402 may pass between the battery cells 110 of the battery module 100.

The wires 402 may pass between the battery cells 110 and through the support frame 400 so as to connect the first bracket 410 and the second bracket 420. Thus, the battery module 100 supported by the first bracket 410 and the battery module 100 supported by the second bracket 420 may both be supported with respect to the support frame 400.

In order for the first bracket 410 and the second bracket 420 to effectively support the battery cells 110 of the battery module 100, the first bracket 410 may include an extension portion 411 and a bent portion 412. In addition, the second bracket 420 may include an extension portion 421 and a bent portion 422.

The extension portions 411 and 421 may extend in a direction corresponding to a direction in which the battery cells 110 are stacked so as to contact first surfaces of the battery cells 110 of the battery module 100. The first surfaces of the battery cells 110 contacting the extension portions 411 and 421 may be opposite to second surfaces of the battery cells 110 that contact the support frame 400. The bent portions 412 and 422 may be bent from the extension portions 411 and 421, respectively, so as to support an uppermost battery cell 110' of the battery module 100 and a lowermost battery cell 110" of the battery module 100.

The bent portions 412 and 422 may contact side surfaces of the uppermost battery cell 110' and the lowermost battery cell 110". In an implementation, the bent portions 412 and 422 may be formed by, e.g., bending ends of the extension portions 411 and 421 by 90 degrees, respectively.

The wires 402 may pass through the support frame 400 and between the battery cells 110 to support the battery modules 100, thereby reducing a space for supporting the battery modules 100 with respect to the support frame 400. Thus, a limited space for accommodating the battery cells 110 may be effectively achieved in the battery pack 10.

In addition, the wires 402 may closely and uniformly attach the battery cells 110 to the support frame 400 in the middle of the battery pack 10 through the spaces between the battery cells 110. Thus, heat generated from the battery cells 110 may be effectively transferred to the support frame 400. According to the present embodiment, cooling efficiency may be improved while the battery cells 110 are accommodated in the limited space of the battery pack 10.

Figure 4:
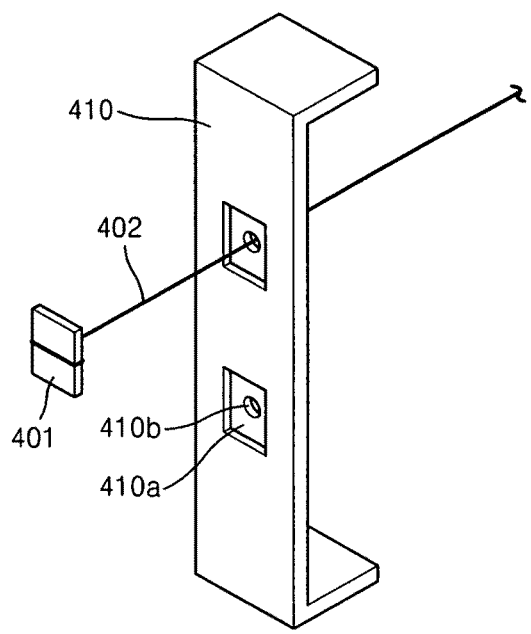
FIG. 4 illustrates a detailed diagram of a first bracket and a wire supporting member of FIG. 1.
Figure 5:
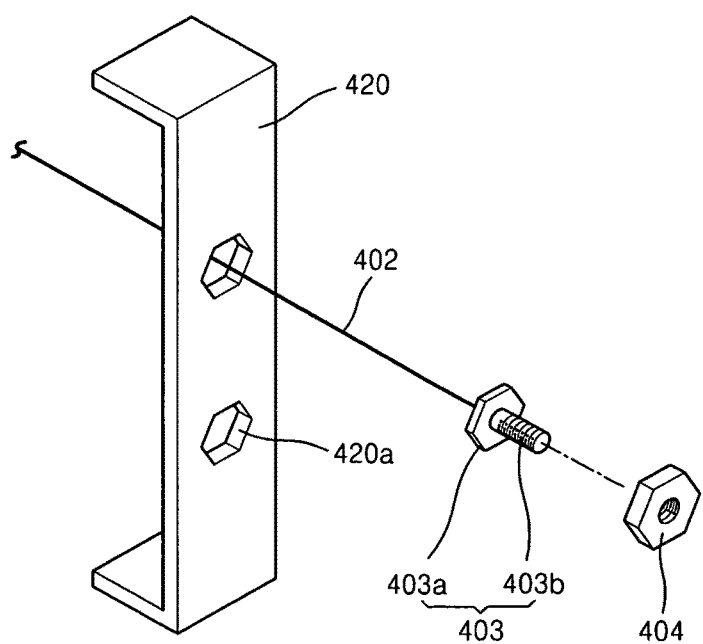
FIG. 5 illustrates a detailed diagram of a second bracket and tension adjusters of FIG. 1.

FIG. 4 illustrates a detailed diagram of the first bracket 410 and a wire supporting member 401 of FIG. 1. FIG. 5 illustrates a detailed diagram of the second bracket 420 and tension adjusters 403 and 404 of FIG. 1.

Referring to FIGS. 4 and 5, the support portion may further include the wire supporting member 401 and the tension adjusters 403 and 404. The wire 402 may be effectively supported with respect to the first bracket 410 and the second bracket 420.

The wire supporting member 401 may be installed in the first bracket 410 to support the wire 402. The tension adjusters 403 and 404 may be installed in the second bracket 420 to support the wire 402 and to adjust the tension of the wire 402.

The wire 402 may surround an external surface of the wire supporting member 401 so that the wire supporting member 401 may support the wire 402. The wire supporting member 401 may be disposed on a first surface of the first bracket 410 opposite to a second surface thereof that contacts the battery cells 110 so as to support the wire 402.

To achieve this, a support groove 410a into which at least a portion of the wire supporting member 401 may be inserted may be disposed in the first surface of the first bracket 410. In this case, a through hole 410b through which the wire 402 passes may be disposed in the support groove 410a.

The wire supporting member 401 may be prevented from sliding and rotating with respect to the first surface of the first bracket 410 by inserting the wire supporting member 401 into the support groove 410a. Thus, when the tension adjusters 403 and 404 rotate in order to adjust the tension of the wire 402, the wire supporting member 401 may be prevented from rotating together with the tension adjusters 403 and 404, thus facilitating adjustment of the tension.

The wire supporting member 401 and the support groove 410a may each have an angular shape. The angular shape of the wire supporting member 401 may correspond to the angular shape of the support groove 410a. Accordingly, the wire supporting member 401 sliding and rotating with respect to the first surface of the first bracket 410 that contacts the wire supporting member 401 may be more effectively prevented.

The tension of the wire 402 may be adjusted by applying a pressure to the battery cells 110 so that the battery cells 110 are closely coupled. To achieve this, the support portion may include the tension adjusters 403 and 404. In this case, the tension adjusters 403 and 404 may include a support bolt 403 and a support nut 404.

One side of the support bolt 403 may be coupled to the wire 402 and another side of the support bolt 403 may be coupled to the support nut 404. The support nut 404 may be screwed to the support bolt 403 so as to adjust the tension of the wires 402.

The support bolt 403 may include a fixation portion 403a at one side thereof and a screw portion 403b at another side thereof. In addition, a support hole 420a into which a portion of the support bolt 403 may be inserted may be disposed in the second bracket 420.

The fixation portion 403a may support and/or fix the wire 402. The fixation portion 403a may pass through the second bracket 420 to be supported by the second bracket 420. The support hole 420a into which the fixation portion 403a is inserted may be disposed in the second bracket 420.

The fixation portion 403a and the support hole 420a may each have an angular shape. The angular shape of the fixation portion 403a may correspond to the angular shape of the support hole 420a. Accordingly, sliding and rotating of the support bolt 403 with respect to the second bracket 420 may be more effectively prevented. Thus, the tension of the wire 402 may be effectively adjusted.

The screw portion 403b may extend from the fixation portion 403a and may include screw threads on an outer circumferential surface thereof. The screw portion 403b may be exposed outside the first surface of the second bracket 420. Thus, the screw portion 403b may be screwed to the support nut 404.

The support nut 404 may be coupled to the screw portion 403b of the support bolt 403 and may contact the first surface of the second bracket 420.

As illustrated in FIG. 3, the battery modules 100 may be disposed on both surfaces of the support frame 400 to be supported; but the embodiments are not limited thereto. In an implementation, as illustrated in FIG. 6, the battery module 100 may be disposed on a single surface of a support frame 400'.

Figure 6:
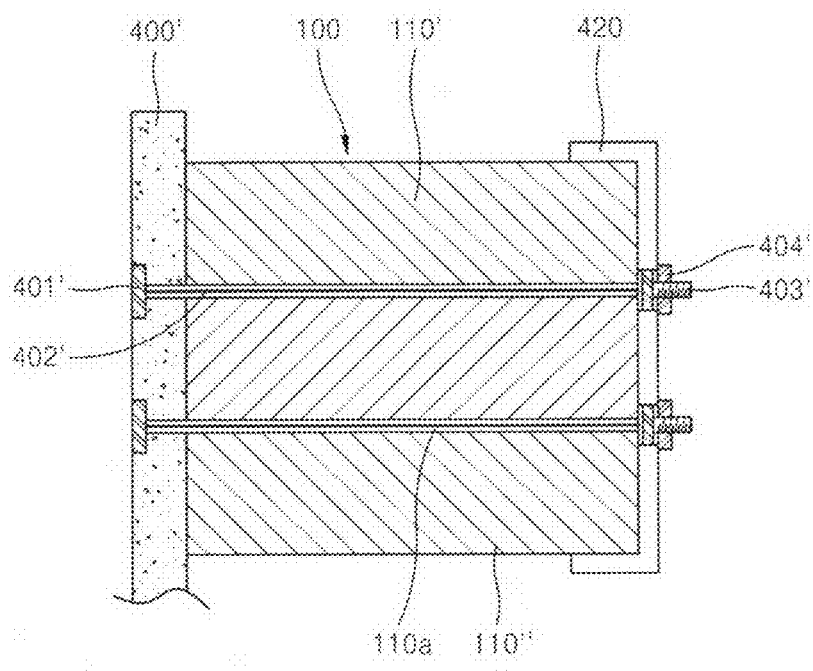
FIG. 6 illustrates a cross-sectional view of battery modules supported with respect to a single surface of a support frame, according to another embodiment.

FIG. 6 illustrates a cross-sectional view of the battery modules 100 supported with respect to a single surface of the support frame 400' according to another embodiment.

In FIG. 6, the battery module 100 may be supported by wires 402' with respect to the support frame 400', like in the case of FIG. 3. Like elements in FIGS. 3 and 6 are denoted by like reference numerals; and thus repeated detailed descriptions thereof are omitted.

Referring to FIG. 6, the support portion may include a second bracket 420, the wire 402', a wire supporting member 401', and tension adjusters 403' and 404'.

The second bracket 420 may be disposed on a first surface of the battery module 100 opposite to a second surface that contacts the support frame 400' so that the battery module 100 may be supported with respect to a single surface of the support frame 400'.

The wires 402' may pass through the support frame 400' to be connected to the second bracket 420. The wires 402' may pass through the spaces 110a between the battery cells 110 so as to support the battery module 100 with respect to the support frame 400.

The wire supporting member 401' may be installed in the support frame 400' so as to support the wires 402'. In this case, the wire supporting member 401' may function similarly to the first bracket 410 of FIG. 3.

The wire supporting member 401' may be disposed on a first surface of the support frame 400' opposite to a second surface of the support frame 400' that contacts the battery module 100 so as to support the wires 402'. To achieve this, a support groove may be formed in the first surface of the support frame 400'.

In order to prevent the wire supporting member 401' from rotating when the tension of the wires 402' is adjusted by the tension adjusters 403' and 404', the support groove and the wire supporting member 401' may each have an angular shape. The angular shape of the support groove may correspond to the angular shape of the wire supporting member 401'.

The tension adjusters 403' and 404' may be installed in the second bracket 420 so as to support the wires 402' and to adjust the tension of the wires 402'. The tension adjusters 403' and 404' may include a support bolt 403' and a support nut 404'.

Thus, according to the present embodiment, cooling efficiency may be improved while the battery cells 110 are accommodated in the limited space of the battery pack 10.

The battery pack 10 may further include a base 200 and a cover 300. The support frame 400 may be installed and supported on the base 200. The cover 300 may be detachably coupled to the base 200 and may accommodate the support frame 400 and the battery modules 100 therein.

FIG. 7 illustrates a schematic cross-sectional view of a circulation flow channel 430 through which cooling fluids may be circulated in the support frame 400, according to an embodiment.

The battery pack 10 may include a fluid tank 510, a pump 520, a connection flow channel 530, and the circulation flow channel 430. The fluid tank 510, the pump 520, and the connection flow channel 530 may be accommodated in the base 200. The circulation flow channel 430 through which cooling fluids are circulated may be disposed in the support frame 400.

The fluid tank 510 may be connected to one end of the circulation flow channel 430 and may accommodate cooling fluids therein. The pump 520 may be connected to another end of the circulation flow channel 430 and may supply the cooling fluids from the fluid tank 510 to the circulation flow channel 430. The connection flow channel 530 may connect the fluid tank 510 and the pump 520 to each other.

A thermal management system (TMS) for dissipating heat generated by the battery module 100 may be installed in the base 200. In an implementation, heat inside the cover 300 may be dissipated by the cooling fluids circulating through the circulation flow channel 430 in the support frame 400, and thus a separate TMS may be omitted.

While the cooling fluids are circulating in the fluid tank 510, the connection flow channel 530, the pump 520, and the circulation flow channel 430, a temperature inside the battery pack 10 may be managed to correspond to an operation of the battery cells 110. The cooling fluids may repeatedly circulate in the battery pack 10.

The cooling fluids may include, e.g., air, water, ethanol, glycerin, and/or refrigerants; but the embodiments are not limited thereto. The cooling fluids may flow through the circulation flow channel 430 and may include various materials including, e.g., a phase change material (PCM).

Cooling fluids inside the fluid tank 510 may be managed to maintain a constant temperature in a predetermined place, e.g., an electricity station. The cooling fluids may be exchanged and/or added at the electricity station. To achieve this, the cover 300 may be detached from the base 200 so that the cooling fluids may be easily exchanged and/or added.

Thus, cooling efficiency of the battery pack 10 may be improved. The battery pack 10 installed using a quick drop method may be detached from a vehicle; and then the cooling fluids inside the fluid tank 510 may be exchanged and/or added from an external element.

Figure 8:
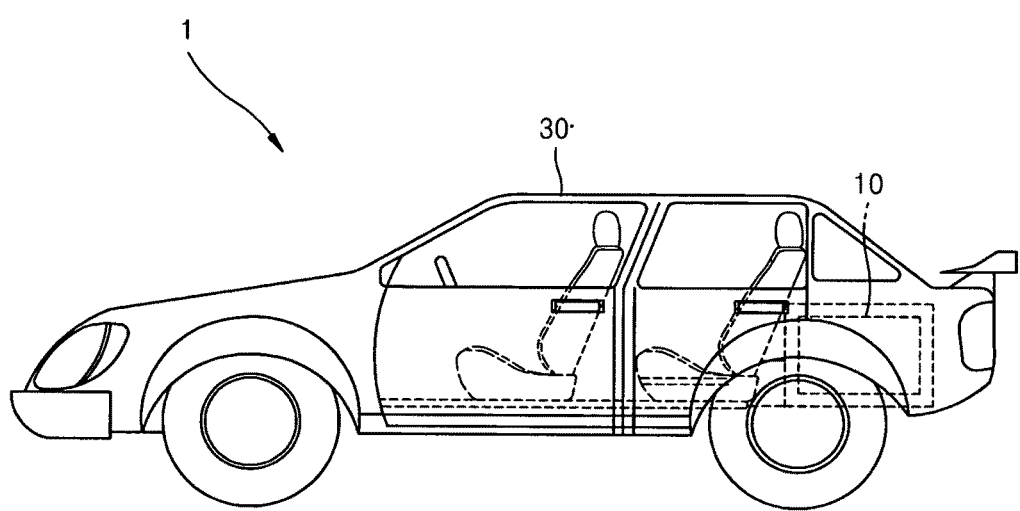
FIG. 8 illustrates a diagram of an electric vehicle including a battery pack according to an embodiment.

FIG. 8 illustrates a diagram of an electric vehicle 1 including the battery pack of FIG. 1.

Referring to FIGS. 1 through 8, the battery pack 10 may be formed by vertically stacking the battery cells 110 to form the battery module 100 and then closely coupling a 2×3 configuration of battery modules 100 to a single surface or two surfaces of the support frame 400.

Here, the circulation flow channel 430 may be disposed in the support frame 400. While cooling fluids are circulating through the circulation flow channel 430, heat generated by the battery cells 110 may be absorbed by the cooling fluids. To achieve this, the battery cells 110 may be uniformly attached to the support frame 400, and thus the battery cells 110 may be effectively cooled.

The battery pack 10 may be installed in a limited space of a vehicle body 30 of the electric vehicle 1. In the battery pack 10 according to the present embodiment, the battery module 100 may be supported by wires with respect to the support frame 400 so as to be installed in a small space.

The battery pack 10 may be installed in the vehicle body 30 by using a quick drop method in which the battery pack 10 is capable of being detached from the electric vehicle 1. In addition, over time, the properties of the cooling fluids may deteriorate or an amount of the cooling fluids may be reduced. However, since the battery pack 10 according to the present embodiment may be installed in the electric vehicle 1 by using the quick drop method, the cooling fluids may be exchanged and/or added at a predetermined place, e.g., an electricity station. Accordingly, the cooling properties of the battery pack 10 may be improved.

As described above, according to the one or more of the above embodiments, cooling efficiency of a battery pack including a plurality of battery cells may be improved while a space for installing the battery cells may be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
    a battery module including a plurality of battery cells, each of the battery cells being spaced apart from every other battery cell;
    a vertical support frame for supporting the battery module; and
    a support portion including a bracket engaging a first surface of the battery module opposite to a second surface of the battery module that contacts the vertical support frame, and a wire for supporting the battery module with respect to the vertical support frame, the wire passing between adjacent battery cells and extending from the bracket to at least the vertical support frame, the battery module being supported from the vertical support frame by the wire and the bracket,
    wherein the battery module is supported with respect to the vertical support frame in such a way that every one of the plurality of battery cells contacts the vertical support frame so as to be supported with respect to the vertical support frame.

2. The battery pack as claimed in claim 1, wherein a plurality of battery modules are disposed on two surfaces of the vertical support frame so as to be supported with respect to the vertical support frame.

3. The battery pack as claimed in claim 2, wherein the bracket includes:
    a first bracket on the first surface of the battery module, the first bracket supporting the battery module with respect to one surface of the vertical support frame;
    a second bracket on the first surface of another battery module opposite to the second surface of the other battery module, the second bracket supporting the other battery module with respect to another surface of the vertical support frame,
    wherein the wire passes through the vertical support frame and the first bracket and connected to the second bracket, and neither the first bracket nor the second bracket contacts the vertical support frame.

4. The battery pack as claimed in claim 3, wherein the first bracket or the second bracket includes:
    an extension portion extending in a direction parallel to a direction in which battery cells are stacked so as to contact first surfaces of the battery cells opposite to second surfaces of the battery cells that contact the vertical support frame; and a bent portion bent from the extension portion, the bent portion contacting a side surface of at least one of an uppermost battery cell of the battery module and a lowermost battery cell of the battery module.

5. The battery pack as claimed in claim 3, wherein the support portion includes:
a wire supporting member on the first bracket, the wire supporting member supporting the wire; and
a tension adjuster on the second bracket, the tension adjuster supporting the wire and being configured to adjust tension of the wire.

6. The battery pack as claimed in claim 5, wherein the wire supporting member:
is disposed on a first surface of the first bracket opposite to a second surface of the first bracket that contacts the battery module, and
supports the wire.

7. The battery pack as claimed in claim 6, wherein the first bracket includes:
a support groove having an angular shape in the first surface thereof, wherein at least a portion of the wire supporting member extends into the support groove, and
a through hole through the support groove, the wire passing through the through hole.

8. The battery pack as claimed in claim 5, wherein the tension adjuster includes:
a support bolt, the support bolt including:
a fixation portion at one side of the support bolt, the fixation portion supporting the wire and passing through the second bracket, and
a screw portion at another side of the support bolt, the screw portion being exposed outside of a first surface of the second bracket opposite to a second surface of the second bracket that contacts the battery module and including a screw thread on an outer circumferential surface thereof; and
a support nut coupled to the screw portion of the support bolt, the support nut contacting the first surface of the second bracket.

9. The battery pack as claimed in claim 8, wherein:
the fixation portion has an angular shape, and
the second bracket includes a support hole that is a though hole, the support hole having an angular shape,
the fixation portion extends into the support hole.

10. The battery pack as claimed in claim 1, further comprising a circulation flow channel in the support frame, the circulation flow channel being configured to circulate cooling fluid.

11. The battery pack as claimed in claim 10, further comprising:

a fluid tank connected to one end of the circulation flow channel, the fluid tank being configured to accommodate the cooling fluid; and
a pump connected to another end of the circulation flow channel, the pump being configured to supply the cooling fluid of the fluid tank to the circulation flow channel.

12. The battery pack as claimed in claim 11, further comprising a horizontally-disposed base for accommodating the fluid tank and the pump, the base supporting a lower portion of the vertical support frame.

13. The battery pack as claimed in claim 1, wherein the battery module is disposed on a single surface of the vertical support frame.

14. The battery pack as claimed in claim 13, wherein:
the bracket supports the battery module with respect to a first surface of the vertical support frame, the wire passes through the vertical support frame and is connected to the second bracket;
a wire supporting member on the vertical support frame supports the wire the wire on the vertical support frame; and
a tension adjuster coupled with the bracket, the tension adjuster supporting the wire and being configured to adjust tension of the wire,
a lowermost end of the vertical support frame is coupled with a horizontally-disposed base,
wherein the bracket does not contact either the vertical support frame or the horizontally-disposed base.

15. The battery pack as claimed in claim 14, wherein the wire supporting member:
is disposed on a second surface of the vertical support frame, the second surface being opposite to the first surface of the support frame, and
supports the wire.

16. The battery pack as claimed in claim 15, wherein:
the vertical support frame includes a support groove having an angular shape in the second surface thereof,
at least a portion of the wire supporting member extends into the support groove, and
the support groove includes a through hole extending through the vertical support frame.

17. A vehicle, comprising:
a vehicle body; and
the battery pack as claimed in claim 1, the battery pack being installed in the vehicle body.

18. The vehicle as claimed in claim 17, wherein the battery pack is detachably attached to the vehicle body.

* * * * *